United States Patent
Broughton

(10) Patent No.: US 7,225,894 B2
(45) Date of Patent: Jun. 5, 2007

(54) POWER STEERING APPARATUS

(75) Inventor: Andrew D. Broughton, Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 36 days.

(21) Appl. No.: 11/044,121

(22) Filed: Jan. 27, 2005

(65) Prior Publication Data
US 2006/0175119 A1    Aug. 10, 2006

(51) Int. Cl.
B62D 5/06    (2006.01)
(52) U.S. Cl. .................. 180/432; 180/417; 180/441; 180/442
(58) Field of Classification Search ............... 180/417, 180/441, 442, 432
See application file for complete search history.

(56) References Cited

U.S. PATENT DOCUMENTS

| 3,727,404 | A | * | 4/1973 | Brewer | 60/430 |
| 4,627,509 | A | * | 12/1986 | Adams et al. | 180/422 |
| 4,775,022 | A | * | 10/1988 | Hirakushi et al. | 180/422 |
| 5,257,670 | A | * | 11/1993 | Miller et al. | 180/405 |
| 5,267,627 | A | * | 12/1993 | Frank et al. | 180/422 |
| 5,634,527 | A | * | 6/1997 | Emori | 180/423 |
| 6,345,682 | B1 | * | 2/2002 | Schoffler et al. | 180/441 |
| 6,546,322 | B2 | | 4/2003 | Williams | |
| 6,929,087 | B1 | * | 8/2005 | Sheppard | 180/417 |

* cited by examiner

Primary Examiner—Lesley D. Morris
Assistant Examiner—Marc A. Scharich
(74) Attorney, Agent, or Firm—Tarolli, Sundheim Covell & Tummino LLP

(57) ABSTRACT

An engine driven pump 24 is connected with a power steering motor assembly 18. An electric motor 36 drives a pump 34 connected with the power steering motor assembly 18. A control apparatus 38, 44, 52, 62 and 72 effects operation of the electric motor 36 to drive the pump 34 when the power steering motor assembly 18 requires fluid in addition to fluid supplied by the engine driven pump 24.

13 Claims, 1 Drawing Sheet

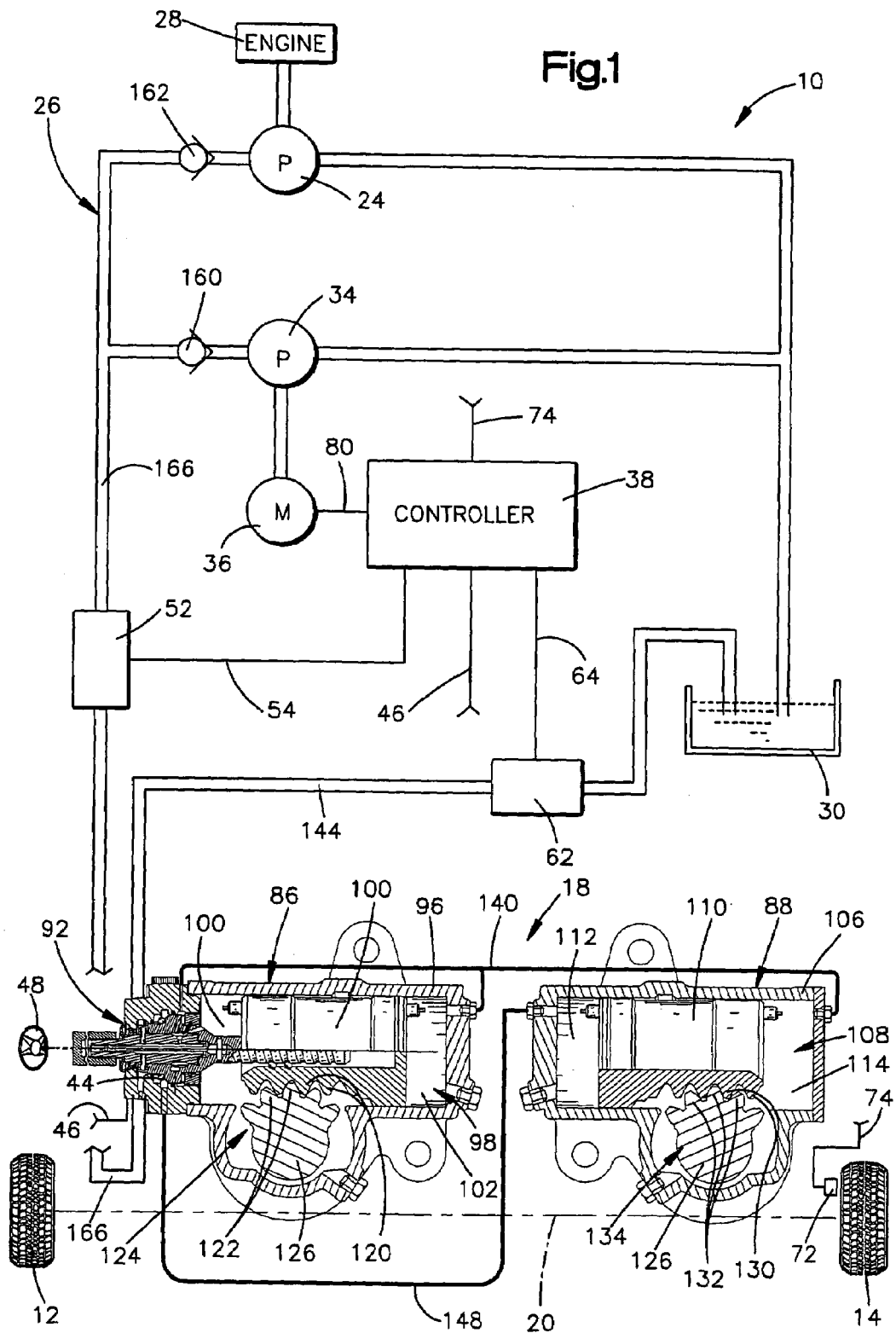

POWER STEERING APPARATUS

BACKGROUND OF THE INVENTION

The present invention is directed to an apparatus for use in turning steerable vehicle wheels.

An apparatus for use in turning steerable vehicle wheels is disclosed in U.S. Pat. No. 6,546,322. This apparatus includes a power steering motor assembly which is connected with the steerable vehicle wheels. A pump is connected with the power steering motor assembly and is driven by either an engine of a vehicle or by an electric motor.

SUMMARY OF THE INVENTION

An improved apparatus for use in turning steerable vehicle wheels includes a power steering motor assembly which is connected with the steerable vehicle wheels. A first pump is connected with the power steering motor assembly. The first pump is driven by an engine of the vehicle to supply fluid under pressure to the power steering motor assembly.

A second pump is connected with the power steering motor assembly. An electric motor is operable to drive the second pump to supply fluid under pressure to the power steering motor assembly. A control apparatus is connected with the electric motor. The control apparatus effects operation of the electric motor to drive the second pump when the power steering motor assembly requires fluid in addition to fluid supplied by the first pump.

The power steering motor assembly may have many different constructions. However, the power steering motor assembly may include first and second power steering motors which are connected with the steerable vehicle wheels. The first and second power steering motors are operable to effect turning movement of the steerable vehicle wheels under the influence of fluid supplied by the first pump until the electric motor is operated to drive the second pump. The first and second power steering motors are operable to effect turning movement of the steerable vehicle wheels under the influence of fluid supplied by the first and second pumps when the electric motor is operated to drive the second pump.

It should be understood that the present invention has many different features. These features may be combined in the manner disclosed herein. Alternatively, the features may be utilized separately from each other or in various combinations with each other and with features from the prior art.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic illustration of a power steering apparatus constructed and operated in accordance with the present invention.

DESCRIPTION OF ONE SPECIFIC PREFERRED EMBODIMENT OF THE INVENTION

General Description

A power steering apparatus 10 (FIG. 1) is used to turn steerable vehicle wheels 12 and 14. The power steering apparatus 10 includes a power steering motor assembly 18. The power steering motor assembly 18 is connected with the steerable vehicle wheels 12 and 14 by a steering linkage 20.

A first pump 24 is connected in fluid communication with the power steering motor assembly 18 by a conduit assembly 26. The first and second pumps 24 and 34 are connected in parallel fluid communication with the power steering motor assembly 18. The first pump 24 is driven by an engine 28 of a vehicle. The first pump 24 is supplied with hydraulic fluid from a reservoir 30. Fluid exhausted from the power steering motor assembly 18 is returned to the reservoir 30.

A second pump 34 is also connected in fluid communication with the power steering motor assembly 18 and the reservoir 30 by the conduit assembly 26. The second pump 34 is driven by a variable speed electric motor 36. The speed of operation of the electric motor 36 is controlled by a controller 38. Although the motor 36 is a variable speed electric motor, an electric motor having a constant operating speed may be used to drive the second pump 34 if desired. If a constant speed electric motor is utilized, the controller 38 would vary the motor between an operating condition and a non-operating condition.

The controller 38 varies the speed of operation of the electric motor as a function of one or more sensed conditions of the power steering apparatus 10 and/or a vehicle with which the power steering apparatus is associated. Thus, a torque sensor 44 is connected with the power steering motor assembly 18. The torque sensor 44 is connected with the controller 38 by an electrical conductor 46. The torque sensor 44 is operable to provide an output signal over the conductor 46 to the controller 38. This output signal varies as a function of variations in torque transmitted from a hand wheel 48 to the power steering motor assembly 18.

A supply flow sensor 52 is connected in fluid communication with the first and second pumps 24 and 34 and the power steering motor assembly 18 by the conduit assembly 26. The supply flow sensor 52 is connected with the controller 38 by an electrical conductor 54. The supply flow sensor 52 is operable to provide an output signal over the conductor 54 to the controller 38. This output signal varies as a function of variations in fluid flow from the first pump 24 or from both the first and second pumps 24 and 34.

A return flow sensor 62 is connected with the power steering motor assembly 18 and reservoir 30 by the conduit assembly 26. The return flow sensor 62 is connected with the controller 38 by an electrical conductor 64. The return flow sensor 62 is operable to provide an output signal over the conductor 64 to the controller 38. This output signal varies as a function of variations in fluid flow from the power steering motor assembly 18 to the reservoir 30.

A vehicle speed sensor 72 is illustrated schematically in FIG. 1 as being associated with the steerable wheel 14 of the vehicle. However, the vehicle speed sensor 72 may be associated with a transmission of the vehicle or other components of the vehicle. The vehicle speed sensor 72 is connected with the controller 38 by an electrical conductor 74. The vehicle speed sensor 72 is operable to provide an output signal over the conductor 74 to the controller 38. This output signal varies as a function of variations in the speed of movement of the vehicle.

The controller 38 is connected with the electric motor 36 by an electrical conductor 80. The controller 38 is operable to vary the speed of operation of the electric motor 36 as a function of variations in the output signals provided by one or more of the sensors 44, 52, 62, and/or 72. The controller 38 effects the operation of the electric motor 36 to drive the second pump 34 when the power steering motor assembly 18 requires fluid in addition to fluid supplied by the first pump 24.

The controller 38 may effect operation of the motor 36 to drive the second pump 34 when the power steering motor assembly 18 requires fluid at a rate which is in excess of a predetermined rate. Alternatively, the controller 38 may effect operation of the electric motor 36 to drive the second pump 34 whenever the rate of flow of hydraulic fluid from the first pump 24 is insufficient to satisfy the demand for power steering fluid by the power steering motor assembly 18. The controller 38 may effect operation of the electric motor 36 to drive the second pump 34 whenever the power steering motor assembly 18 requires fluid at a rate which is in excess of a predetermined rate and/or whenever the rate of flow of fluid from the first pump 24 is insufficient to satisfy the demand for power steering fluid by the power steering motor assembly.

It is believed that the second pump 34 may be driven by the electric motor 36 when the hand wheel 48 is turned rapidly during an emergency maneuver or any other operating situations. It is also contemplated that the second pump 34 may be driven by the electric motor 36 during slow speed maneuvering operations and/or parking operations. It is contemplated that the output from the first pump 34 will be sufficient to supply hydraulic fluid to the power steering motor assembly 18 during operation of the vehicle at highway or intermediate operating speeds. When the output from the first pump 24 is sufficient to satisfy the hydraulic fluid for the power steering motor assembly 18, the motor 36 is deenergized and does not drive the second pump 34.

Although a plurality of sensors 44, 52, 62, and 72 are used in association with the controller 38, it is contemplated that one or more of these sensors may be eliminated. For example, the vehicle speed sensor 72 may be eliminated if desired. As another example, the return flow sensor 62 may be eliminated if desired. As a further example, both the return flow sensor 62 and the vehicle speed sensor 72 may be eliminated if desired. It is contemplated that various combinations of sensors will be utilized in association with the controller 38 to control the operation of the electric motor 36. The combination of sensors utilized with the controller 38 may include other sensors in addition to or instead of the illustrated sensors.

The power steering motor assembly 18 includes a first or left (as viewed in FIG. 1) power steering motor 86 and a second or right (as viewed in FIG. 1) power steering motor 88. The power steering motors 86 and 88 are connected in fluid communication with each other. The power steering motors 86 and 88 are connected in fluid communication with the pumps 24 and 34 and with the reservoir 30 by the conduit assembly 26.

A single power steering control valve 92 is provided to control fluid flow to and from the power steering motors 86 and 88. The power steering control valve 92 is connected with the hand wheel 48. The power steering control valve 92 is operated in response to rotation of the hand wheel 48 to direct fluid flow to both of the power steering motors 86 and 88. Simultaneous operation of the power steering motors 86 and 88 actuates the steering linkage 20 to effect turning movement of the steerable vehicle wheels 12 and 14 under the influence of force transmitted from the power steering motors to the steering linkage.

The first or left power steering motor 86 includes a housing 96 having a chamber 98 in which a generally cylindrical piston 100 is disposed. The piston 100 is effective to divide the chamber 98 into a rod end portion 100 and a head end portion 102. The piston 100 is axially movable in the chamber 98 to vary the size of the rod end and head end portions 100 and 102 of the chamber 98.

Similarly, the second or right power steering motor 88 includes a housing 106 which at least partially defines a chamber 108. A generally cylindrical piston 110 is disposed in the chamber 108. The piston 110 divides the chamber 108 into a head end portion 112 and a rod end portion 114.

Simultaneous movement of the pistons 100 and 110 in the housings 96 and 106 is effective to actuate the steering linkage 20. The piston 100 is connected to the steering linkage 20 through a linear array of rack teeth 120. The rack teeth 120 are disposed in meshing engagement with an arcuate array of pinion teeth 122. The pinion teeth 122 form part of a sector gear 124. The sector gear 124 is connected with an output shaft 126.

Similarly, the piston 110 is connected to the steering linkage 20 through a linear array of rack teeth 130. The rack teeth 130 are disposed in meshing engagement with an arcuate array of pinion teeth 132. The pinion teeth 132 form part of a sector gear 134. The sector gear 134 is connected with the output shaft 126.

If desired, the sector gears 124 and 134 may both be integrally formed as one piece with the output shaft 126. Alternatively, the sector gears 124 and 134 may be formed separately from the output shaft 126 and connected with the output shaft. Depending upon the construction of the steering linkage 20, the sector gears 124 and 134 may be connected with separate output shafts.

During operation of the power steering motor assembly 18, the pistons 100 and 110 are both moved at the same speed and in the same direction (as viewed in FIG. 1) under the influence of hydraulic fluid conducted from the first pump 24 or from both the first pump 24 and the second pump 34. Upon rotation of the hand wheel 48 to actuate the power steering control valve 92 in one direction, the fluid pressure in the head end portion 102 of the chamber 98 of the power steering motor 86 increases. At the same time, the fluid pressure in the rod end portion 100 of the chamber 98 is exhausted to the reservoir 30. As this is occurring, the fluid pressure in the rod end portion 114 of the chamber 108 of the power steering motor 88 increases. In addition, the fluid pressure in the head end portion 112 of the chamber 108 is exhausted to the reservoir 30.

This results in the pistons 100 and 110 both moving toward the left (as viewed in FIG. 1). As the pistons 100 and 110 move toward the left, the sector gears 124 and 134 are rotated in a counterclockwise direction (as viewed in FIG. 1) to actuate the steering linkage 20. Actuation of the steering linkage 20 is effective to turn the steerable vehicle wheels 12 and 14 in a first direction in a known manner.

Similarly, upon rotation of the hand wheel 48 in the opposite direction, the power steering valve 92 is actuated. Actuation of the power steering valve 92 is effective to direct high fluid pressure into the rod end portion 100 of the chamber 98 in the first or left power steering motor 86 and to exhaust the head end portion 102 of the chamber 98 to the reservoir 30. At the same time, the fluid pressure in the head end portion 112 of the chamber 108 in the second or right power steering motor 88 is increased and the rod end portion 114 of the chamber 108 is exhausted to the reservoir 30.

This results in the pistons 100 and 110 in the power steering motors 86 and 88 moving toward the right (as viewed in FIG. 1). As this occurs, the sector gears 124 and 134 are rotated in a clockwise direction to actuate steering linkage 20. Actuation of the steering linkage 20 is effective to turn the steerable vehicle wheels in a second direction.

The first or left power steering motor 86 is connected in parallel with the second or right power steering motor 88. Upon actuation of the power steering control valve 92 in response to the rotation of the hand wheel in a first direction, the power steering control valve 92 is effective to direct high fluid pressure to a conduit 140 in the power steering motor assembly 18.

The left (as viewed in FIG. 1) end portion of the conduit 140 is connected with the power steering control valve 92. A central portion of the conduit 140 is connected with the head end portion 102 of the chamber 98 in the power steering motor 86. The right (as viewed in FIG. 1) end portion of the conduit 140 is connected with the rod end portion 114 of the chamber 108 in the second or right power steering motor 88.

Rotation of the hand wheel 48 in the first direction is effective to actuate the power steering control valve 92. Actuation of the power steering control valve 92 directs high fluid pressure to the conduit 140. The conduit 140 conducts the same high fluid pressure to the head end portion 102 of the chamber 98 in the power steering motor 86 and to the rod end portion 114 of the chamber 108 in the power steering motor 88.

When the power steering control valve 92 is actuated to direct high fluid pressure to the conduit 140, the control valve 92 is also effective to connect the rod end portion 100 of the chamber 98 in the power steering motor 86 and the head end portion 112 of the chamber 108 in the power steering motor 88 in fluid communication with the reservoir 30 through a conduit 144 in the conduit assembly 26. The head end portion 112 of the right power steering motor 88 is connected in fluid communication with the power steering control valve 92 through a conduit 148 in the power steering motor assembly 18. The conduit 148 and the rod end portion 100 of the chamber 98 are both connected in fluid communication with the conduit 144 and the reservoir 30 through the actuated power steering control valve 92. Therefore, hydraulic fluid is exhausted from both the left power steering motor 86 and the right power steering motor 88 through the power steering control valve 92 to the conduit 144 and the reservoir 30 during operation of the power steering motors 86 and 88 in a first direction.

Similarly, when the hand wheel 48 is turned in the second or opposite direction, the power steering control valve 92 is effective to direct high pressure fluid to the rod end portion 100 of the chamber 98 in the left power steering motor 86 and to direct high pressure fluid to the conduit 148 and the head end portion 112 of the chamber 108 in the right power steering motor 88. At the same time, the power steering control valve 92 is effective to connect the head end portion 102 of the chamber 98 in the power steering motor 86 and the head end portion 114 of the chamber 108 in the power steering motor 88 with the drain conduit 144.

The general construction of the power steering control valve 92 is well known. The power steering control valve 92 has the same construction as is disclosed in U.S. Pat. No. 6,546,322. Of course, the power steering control valve 92 may have a different construction if desired. For example, the power steering control valve 92 may be spaced from both of the power steering motors 86 and 88.

It is contemplated that the power steering motor assembly 18 may have a construction which is different from the illustrated construction. For example the power steering motors 86 and 88 may be of the general type which are used with rack and pinion steering gear rather than integral steering gear. As another example, only one power steering motor may be used in the power steering motor assembly 18.

Operation

During most vehicle operating conditions, the first pump 24 will be driven by the engine 28 to provide a flow of hydraulic fluid which is adequate to effect operation of the power steering motor assembly 18. When the first pump 24 can supply the hydraulic fluid to operate the power steering motor assembly 18, rotation of the steering wheel is effective to actuate the torque sensor 44. The output from the torque sensor 44 to the controller 38 will have a value which does not result in energization of the electric motor 36 by the controller 38. The manner in which the torque sensor 44 is connected with the power steering control valve 92 may be the same as is disclosed in the aforementioned U.S. Pat. No. 6,546,322.

When the first pump 24 can supply an adequate flow of hydraulic fluid, the output signal from the supply flow sensor 52 corresponds to a fluid pressure representative of a rate of flow of fluid which is supplied by the first pump 24. At this time, the output signal from the supply flow sensor 52 is ineffective to cause the controller 38 to energize the electric motor 36. Similarly, the signal transmitted from the return flow sensor 62 is indicative of a rate of fluid flow which does not result in the controller 38 activating the electric motor 36. A check valve 160 is effective to block fluid flow from the first pump 24 to the second pump 34.

It is contemplated that the first pump 24 may be ineffective to supply the demands of the power steering motor assembly 18 for hydraulic fluid during rapid or emergency steering maneuvers and during parking of a vehicle. When the first pump 24 is ineffective to supply the demands of the power steering motor assembly 18 for fluid, the controller 38 effects operation of the motor 36 to drive the second pump 34. Since the two pumps 24 and 34 are connected in parallel fluid communication with the power steering motor assembly 18, the fluid outputs from the two pumps are combined. The combined hydraulic fluid flow from the two pumps 24 and 34 is effective to supply the maximum demands of the power steering motor assembly 18 for hydraulic fluid.

When the first pump 24 is ineffective to adequately supply the power steering motor assembly 18 with hydraulic fluid, the torque transmitted from the hand wheel 48 to the power steering control valve 92 is increased with a resulting change in the output signal from the torque sensor 44. In response to the output signal from the torque sensor 44, the controller 38 effects operation of the motor 36 to drive the second pump 34 at a speed which is a function of the output signal from the torque sensor.

Operation of the second pump 34 results in hydraulic fluid being supplied by both the first pump 24 and the second pump. The combined flow of hydraulic fluid from the first and second pumps 24 and 34 is effective to supply sufficient hydraulic fluid to operate the power steering motor assembly 18.

Similarly, in the event that the demand for hydraulic fluid by the power steering motor assembly 18 exceeds the rate at which hydraulic fluid is supplied by the first pump 24, the fluid pressure in a conduit 166 in the conduit assembly 26 decreases. This decrease in fluid pressure is sensed by the supply flow sensor 52 with a resulting change in the output signal transmitted over the conductor 54 to the controller 38. In response to this change in the signal transmitted from the supply flow sensor 52 to the controller 38, the controller 38 effects operation of the electric motor 36 to drive the second pump 34 at a speed which is a function of the output signal from the supply flow sensor 52. The output of the two pumps 24 and 34 is sufficient to supply the power steering motor assembly 18 with hydraulic fluid.

During operation of the power steering apparatus 10, the rate of flow of hydraulic fluid from the power steering motor assembly 18 through the conduit 144 to the reservoir 30 may change with a resulting change in the output from the return flow sensor 62. In response to the change in the output from the return flow sensor 62, the controller 38 effects operation of the electric motor 36 to drive the pump 34 at a speed which is a function of the output signal from the return flow sensor 62. Operation of both the first pump 24 and the second pump 34 is sufficient to supply by the demands of the power steering motor assembly 18 for hydraulic fluid.

Although the torque sensor 44, supply flow sensor 52, and return flow sensor 62 are all provided in association with the controller 38, a change in the output signal from any one of the sensors is sufficient to cause the controller to initiate operation of the motor 36. Therefore, the motor 36 is energized to drive the second pump 34 whenever the torque required to actuate the power steering valve 92 exceeds a predetermined amount, or the fluid pressure in the conduit 166 is less than a fluid pressure required by the power steering motor assembly 18, or the return fluid flow in the conduit 144 is less than a fluid flow required by the power steering motor assembly 18. It should be understood that only one or two of the sensors 44, 52 and 62 may be provided in the apparatus 10.

For example, only the supply flow sensor 52 may be provided. If this was done, the controller 38 would effect energization of the motor 36 to drive the pump 34 whenever the fluid pressure in the conduit 166 falls below a predetermined fluid pressure. As another example, only the torque sensor 44 may be provided. If this was done, the controller 38 would effect energization of the motor 36 to drive the pump 34 whenever the torque applied to the power steering control valve 92 exceeds a predetermined amount. If both the flow sensor 52 and torque sensor 44 are utilized, the controller 38 would effect energization of the motor 36 whenever the fluid pressure in the conduit 166 falls below a predetermined pressure and/or the torque applied to the control valve 92 exceeds a predetermined amount.

During high speed operation of the vehicle 72, the output signal from the speed sensor 72 to the controller 38 is effective to cause the controller 38 to maintain the electric motor 36 in a deenergized condition. This is because, during high speed operation of the vehicle, the pump 24 is effective to satisfy the demands of the power steering motor assembly 18 for hydraulic fluid. Therefore, the controller 38 does not energize the electric motor 36 to drive the second pump 34 unless the output from the vehicle speed sensor 72 indicates that the speed of the vehicle is below a predetermined minimum speed.

From the above description of the invention, those skilled in the art will perceive improvements, changes and modifications. Such improvements, changes and modifications are intended to be covered by the appended claims.

Having described the invention, the following is claimed:

1. An apparatus for use in turning steerable vehicle wheels, said apparatus comprising:
   a power steering motor assembly connected with the steerable vehicle wheels, said power steering motor assembly includes first and second power steering motors which are connected with the steerable vehicle wheels;
   a first pump which is connected with said power steering motor assembly and is driven by an engine of the vehicle to supply fluid under pressure to said power steering motor assembly;
   a second pump which is connected with said power steering motor assembly;
   an electric motor which is connected with said second pump and is operable to drive said second pump to supply fluid under pressure to said power steering motor assembly; and
   control apparatus connected with said electric motor to effect operation of said electric motor to drive said second pump when said power steering motor assembly requires fluid in addition to fluid supplied by said first pump, said first and second power steering motors being operable to effect turning movement of the steerable vehicle wheels under the influence of fluid supplied by said first pump until said control apparatus effects operation of said electric motor to drive said second pump, said first and second power steering motors being operable to effect turning movement of the steerable vehicle wheels under the influence of fluid supplied by said first and second pumps when said electric motor is operated to drive said second pump.

2. The apparatus as set forth in claim 1 wherein said control apparatus includes a torque sensor which is connected with said power steering motor assembly and is operable to provide an output signal which varies as a function of variations in torque transmitted from a hand wheel to said power steering motor assembly, and a controller which is connected with said torque sensor and said electric motor to vary an operating speed of said electric motor as a function of variations in the output signal from said torque sensor.

3. The apparatus as set forth in claim 1 wherein said control apparatus includes a flow sensor which is connected in fluid communication with at least one of said first and second pumps and is operable to provide an output signal which varies as a function of variations in fluid flow from at least said one of said first and second pumps, and a controller which is connected with said flow sensor and said electric motor to vary an operating speed of said electric motor as a function of variations in the output signal from said flow sensor.

4. The apparatus as set forth in claim 1 wherein said control apparatus includes a flow sensor which is connected in fluid communication with said power steering motor assembly and is operable to provide an output signal which varies as a function of variations in fluid flow from said power steering motor assembly, and a controller which is connected with said flow sensor and said electric motor to vary an operating speed of said electric motor as a function of variations in the output signal from said flow sensor.

5. The apparatus as set forth in claim 1 wherein said control apparatus includes a flow sensor which is connected in fluid communication with said first and second pumps and is operable to provide an output signal which varies as a function of variations in fluid flow from said first and second pumps, and a controller which is connected with said flow sensor and said electric motor to vary an operating speed of said electric motor as a function of the output from said flow sensor.

6. The apparatus as set forth in claim 1 wherein said first and second power steering motors are connected with a single control valve which is operable in response to rotation of a hand wheel to direct fluid flow to said first and second power steering motors to effect turning movement of the steerable vehicle wheels under the influence of force transmitted from said first and second power steering motors.

7. The apparatus as set forth in claim 1 wherein said first power steering motor includes a first piston which is movable under the influence of fluid pressure, first rack teeth being connected with said first piston and being disposed in meshing engagement with first output gear teeth connected with a steering linkage connected with the steerable vehicle wheels, said second power steering motor includes a second piston which is movable under the influence of fluid pressure, second rack teeth being connected with said second piston and being disposed in meshing engagement with second output gear teeth connected with the steering linkage.

8. The apparatus for use in turning steerable vehicle wheels, said apparatus comprising:
first and second power steering motors which are connected with the steerable vehicle wheels;
a first pump which is driven by an engine of the vehicle to provide a first source of fluid under pressure;
a second pump which is connected with an electric motor, said electric motor being operable to drive said second pump to provide a second source of fluid under pressure;
a control valve which is connected in fluid communication with said first and second power steering motors and with said first and second pumps, said control valve being operable to direct fluid pressure from only said first pump to said first and second power steering motors in response to rotation of a hand wheel when said electric motor is in a nonoperating condition in which said electric motor is ineffective to drive said second pump, said control valve being operable to direct fluid pressure from said first and second pumps to said first and second power steering motors in response to rotation of the hand wheel when said electric motor is in an operating condition in which said electric motor is effective to drive said second pump;
a sensor which senses when fluid pressure in addition to fluid pressure supplied by said first pump is required to effect operation of said first and second power steering motors; and
control apparatus connected with said sensor and said electric motor to effect operation of said electric motor to drive said second pump in response to said sensor sensing that fluid pressure in addition to the fluid pressure supplied by said first pump is required to effect operation of said first and second power steering motors.

9. The apparatus as set forth in claim 8 wherein said sensor is operable to provide an output signal which varies as a function of variations in torque transmitted from the hand wheel, and a controller is connected with said torque sensor and said electric motor to vary an operating speed of said electric motor as a function of variations in the output signal from said sensor.

10. The apparatus as set forth in claim 8 wherein a flow sensor is connected in fluid communication with at least one of said first and second pumps and is operable to provide an output signal which varies as a function of variations in fluid flow from at least said one of said first and second pumps, a controller is connected with said flow sensor and said electric motor to vary an operating speed of said electric motor as a function of variations in the output signal from said flow sensor.

11. The apparatus as set forth in claim 8 wherein a flow sensor is connected in fluid communication with said control valve and is operable to provide an output signal which varies as a function of variations in fluid flow from at least one of said first and second pumps, a controller is connected with said flow sensor and said electric motor to vary an operating speed of said electric motor as a function of variations in the output signal from said flow sensor.

12. The apparatus as set forth in claim 8 wherein a flow sensor is connected in fluid communication with said first and second pumps and is operable to provide an output signal which varies as a function of variations in fluid flow from said first and second pumps, a controller is connected with said flow sensor and said electric motor to vary an operating speed of said electric motor as a function of the output from said flow sensor.

13. The apparatus as set forth in claim 8 wherein said first power steering motor includes a first piston which is movable under the influence of fluid pressure, first rack teeth being connected with said first piston and being disposed in meshing engagement with first output gear teeth connected with a steering linkage connected with the steerable vehicle wheels, said second power steering motor includes a second piston which is movable under the influence of fluid pressure, second rack teeth being connected with said second piston and being disposed in meshing engagement with second output gear teeth connected with the steering linkage.

* * * * *